| (12) | United States Patent | (10) Patent No.: | US 7,274,284 B2 |
|---|---|---|---|
| | Dressen | (45) Date of Patent: | Sep. 25, 2007 |

(54) METHOD FOR RF CARD DETECTION IN A CONTACTLESS SYSTEM

(75) Inventor: Phillip D. Dressen, Pueblo West, CO (US)

(73) Assignee: Atmel Corporation, San Jose, CA (US)

( * ) Notice: Subject to any disclaimer, the term of this patent is extended or adjusted under 35 U.S.C. 154(b) by 440 days.

(21) Appl. No.: 11/051,015

(22) Filed: Feb. 4, 2005

(65) Prior Publication Data

US 2006/0175406 A1   Aug. 10, 2006

(51) Int. Cl.
  *H04Q 5/22*    (2006.01)
  *G08B 13/14*   (2006.01)
  *G06K 7/08*    (2006.01)

(52) U.S. Cl. .................. 340/10.2; 340/10.1; 340/10.4; 340/572.2; 340/572.4; 235/451

(58) Field of Classification Search ............... 340/10.2, 340/10.1, 10.4, 572.2, 572.4; 235/451
See application file for complete search history.

(56) References Cited

U.S. PATENT DOCUMENTS

| 5,698,837 | A * | 12/1997 | Furuta ........................ 235/492 |
| 6,354,500 | B1 * | 3/2002 | Gercekci et al. ............ 235/451 |
| 6,388,562 | B1 * | 5/2002 | Takiguchi et al. ......... 340/10.2 |
| 6,469,618 | B1 | 10/2002 | Gaultier ..................... 340/10.3 |
| 6,690,263 | B1 | 2/2004 | Grieu ........................ 340/10.4 |
| 2004/0116074 | A1 | 6/2004 | Fujii et al. ................. 455/41.2 |

OTHER PUBLICATIONS

STMicroelectronics Datasheet, "SRIX4K", Apr. 2004, pp. 1-43.
ISO/IEC 14443-3 standard, Part 3: Initial-ization and Anticollision, Jun. 11, 1999, pp. 1-44.

* cited by examiner

*Primary Examiner*—Jeffery Hofsass
*Assistant Examiner*—Scott Au
(74) *Attorney, Agent, or Firm*—Schneck & Schneck; Thomas Schneck

(57) ABSTRACT

A method and processor-readable storage medium for performing the method of identifying RF cards in a card reader's field. Polling requests are sent to cards in a card reader's field. Where a clear response from the sent command is received from a responding card, the response is saved, the responding card moved to an Active state, and the timeslot number incremented if possible and the above steps repeated until no clear response is received. Where no clear response is received, a determination of whether a collision has occurred is made. If no collision occurred, the timeslot number is incremented; if a collision did occur, another polling request is sent. Discovered cards are returned when no cards or collisions are detected after every timeslot is polled.

18 Claims, 3 Drawing Sheets

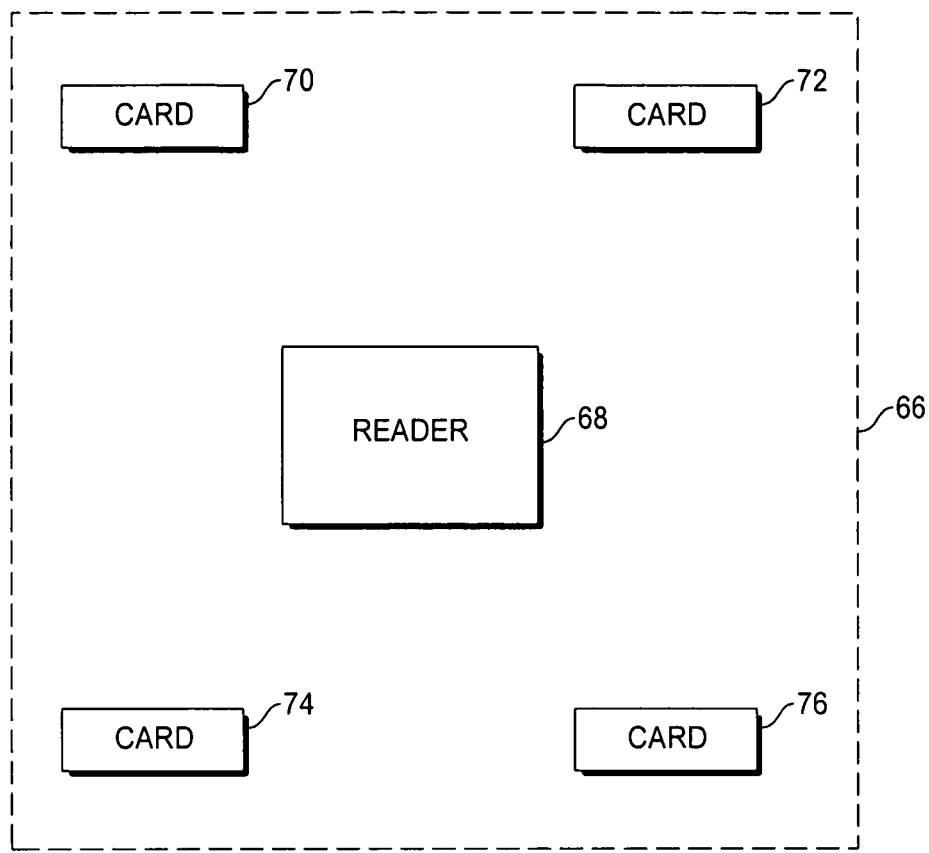
Fig._1 (PRIOR ART)
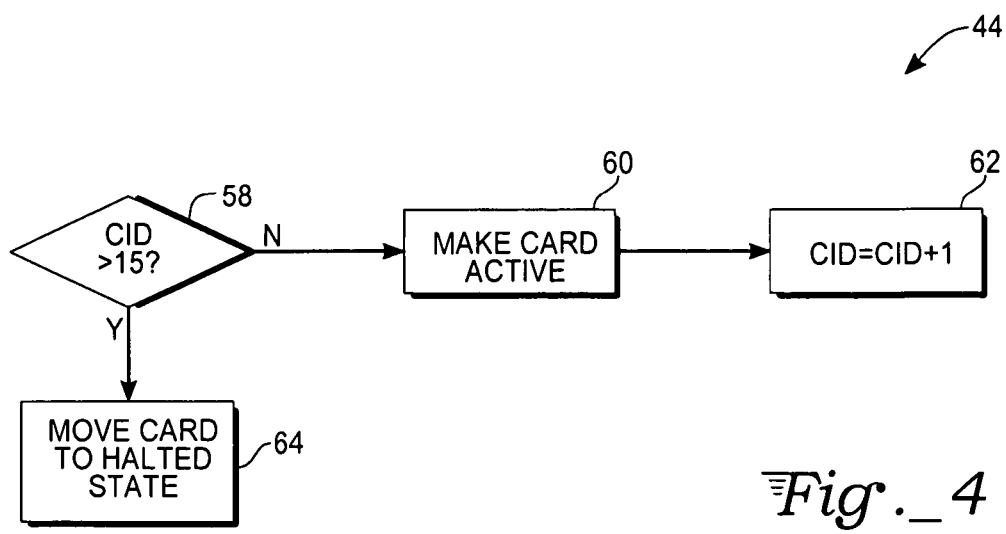
Fig._4

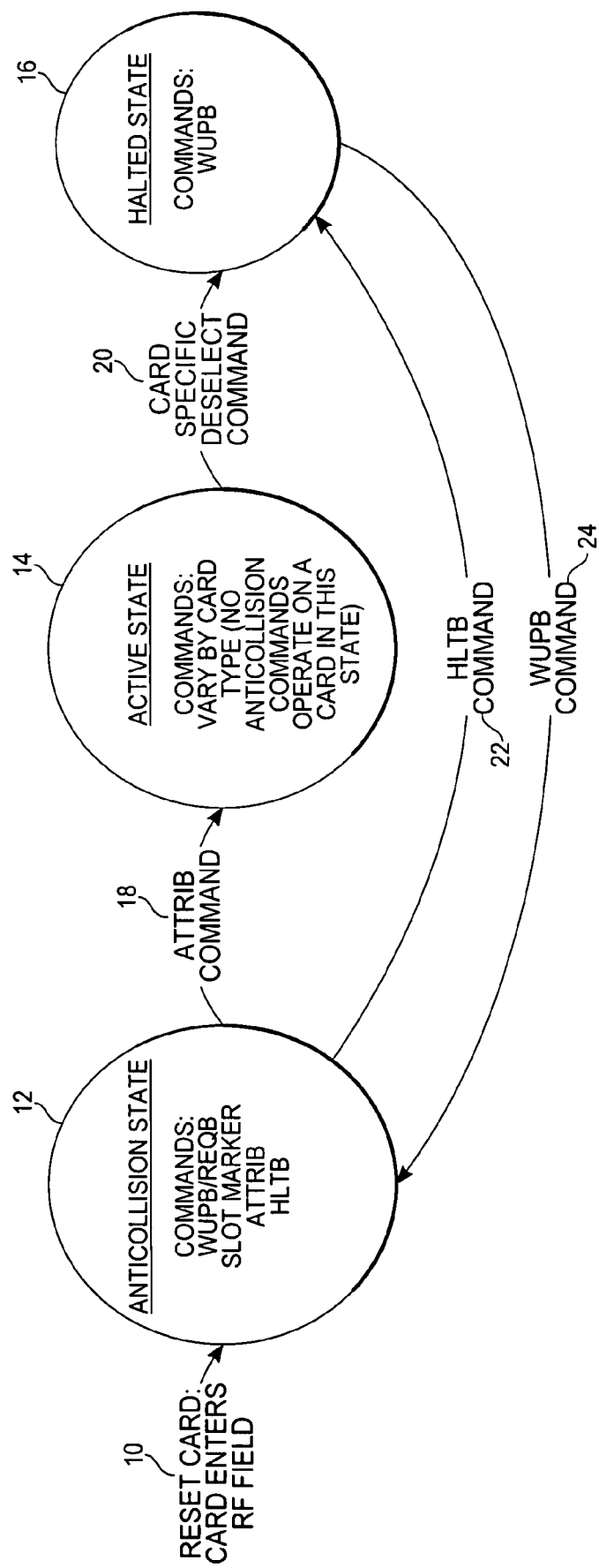
Fig._2 (PRIOR ART)

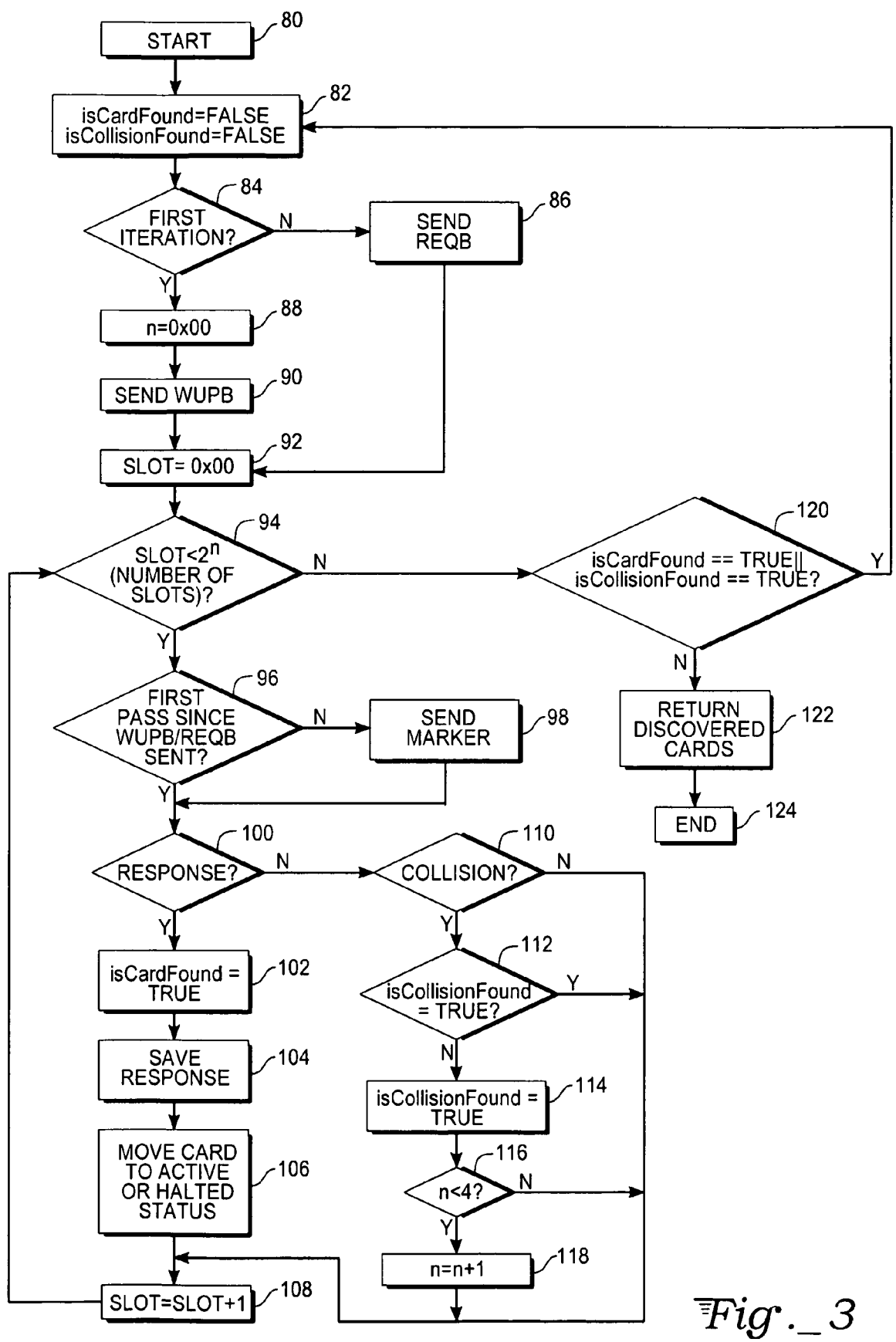
Fig._3

METHOD FOR RF CARD DETECTION IN A CONTACTLESS SYSTEM

FIELD OF THE INVENTION

This invention relates to detecting RF cards within an RF card reader's field.

BACKGROUND ART

Radio frequency identification ("RFID") is becoming increasingly common. RFID uses wireless radio communications to identify and collect information about objects. Information about an object may be created or updated "on the fly" after the object is identified. RFID may be used in a wide range of applications including identity cards.

RFID systems consist of one or more readers and transponders, contactless memory tags that communicate with the reader. Transponders may be carried on identity cards. The transponders contain data allowing the card to be identified and are made of a memory associated with a radio frequency communication block. The reader is connected to an antenna which transmits and receives the radio frequency signal to and from the transponders. In FIG. 1, a reader 68 of the prior art may communicate with all the cards 70, 72, 74, and 76 in its RF field 66. The reader 68 cannot communicate with a card 78 outside its field 66.

When a reader communicates with the transponders or cards within its fields, collisions occasionally occur if more than one transponder or card tries to reply to the reader at the same time. When a collision occurs, the reader does not receive a clear response from either card.

Anticollision mechanisms may be employed to prevent more than one card from transmitting at the same time. A probabilistic anticollision mechanism repeatedly prompts cards to reply within a single timeslot. However, using this approach, the presence of multiple cards may not be detected until the responding card is removed from the field or the state where it can respond to requests from the reader. A timeslot anticollision method may be employed where the reader will send out polling commands prompting responses from cards which have chosen a timeslot in which to respond.

It would be desirable to have a method which could build a list of cards in the reader's field to know which cards are present before processing a card. It would be further desireable to know which state the cards are in and to be able to change the card's state.

SUMMARY OF THE INVENTION

A method and processor-readable medium for performing the method of identifying RF cards in an RF card reader's field are presented. The method comprises sending a command from a group of commands including: a first polling command requesting a response from any card in the field in an Anticollision state, said first polling command also moving any card in a Halted state to the Anticollision state; a second polling command requesting a response from any card in the field in the Anticollision state; and a third polling command requesting a response from any card in the field in the Anticollision state which has chosen a particular timeslot in which to respond. Where a clear response from the sent command is received from a responding card, the response is saved, the responding card moved to an Active state, and the timeslot number incremented if possible and the above steps repeated until no clear response is received. If incrementing the timeslot number is not possible, a value is returned indicating the number of responding cards. Where no clear response is received from a responding card, a determination of whether a collision occurred is made and, if so, the above steps are repeated until no clear response is received. If no collision occurred, a value is returned indicating the number of responding cards.

BRIEF DESCRIPTION OF THE DRAWINGS

FIG. 1 is a block diagram of an RF card reader with RF cards inside and outside the card reader's RF field as known in the prior art.

FIG. 2 is a state diagram of an RF card as known in the prior art.

FIG. 3 is an exemplary flowchart showing how RF cards are identified in accordance with the present invention.

FIG. 4 is an exemplary flowchart showing how RF cards are moved to an Active state in accordance with the present invention.

DETAILED DESCRIPTION

The commands used in the embodiments described below are commands for Type B signaling described in the ISO/IEC 14443 standard. However, commands from other standards and/or other signaling schemes may be employed in other embodiments. The relevant commands are: Request B ("REQB"); Wake-Up B ("WUPB"); Slot Marker ("MARKER"); Proximity Card Selection Command ("ATTRIB"); and Halt B ("HLTB").

REQB sends a polling request out to all Anticollision state proximity cards ("PICCs" or "cards"). When this command is sent, the number of timeslots, "N," is assigned to the PICCs, which then choose a random value from 1 to "N" as their timeslot assignment. PICCs choosing the timeslot value "1" will respond with an Answer to Request of Type B ("ATQB") immediately. The value for "N" is reassigned and new random timeslots are chosen with every REQB and WUPB (discussed below) command.

WUPB is similar to REQB with one difference. When the WUPB command is sent, cards in the Halted state are moved to the Anticollision state.

MARKER or SLOT MARKER is an additional polling command which sends out a polling request for cards which have chosen a particular timeslot. Cards which have chosen the particular timeslot for which this command is sent will respond to this request with an ATQB response.

ATTRIB is used to move a PICC into the Active state. A card receiving an ATTRIB command is selected and assigned to a dedicated channel. An unused Card Identifier ("CID") value needs to be assigned to a card in order for that card to be in an Active state since Active state commands use the CID to reference the card.

HLTB commands move the card into the Halted state. The card will remain in the Halted state until it is reset or receives a WUPB command.

In FIG. 2, a prior art card (not shown) is reset or enters an RF field (10). The card may be in one of three states: Anticollision (12), Active (14), or Halted (16). If a card is in the Halted state (16), it may be "woken up" by a WUPB command (24), which will move the card to the Anticollision state (12). In the Anticollision state (12), the card will respond to the following commands, discussed above: WUPB, REQB, SLOT MARKER, ATTRIB, and HLTB. From the Anticollision state (12), the card may be moved into the Active state (14) by the ATTRIB command (18). In the Active state (14), commands vary by card type, though no Anticollision commands operate on cards in the Active state. A card may be moved from the Active state (14) to the Halted state (16) by a card-specific Deselect command (20). A card may also be moved from the Anticollision state (12) to the Halted state (16) by the HLTB command (22).

The present invention for identifying RF cards within a reader's field may be implemented by software, hardware, or a combination of software and hardware. When all or portions of the invention are implemented in software, the software can reside on a processor-readable storage medium (examples of which include, but are not limited to, magnetic optical, optical, or semiconductor storage media, such as floppy disks, hard disks, CD ROMs, memory ICs, etc.). The processor-readable storage medium stores code capable of programming the processor (which is in communication with the processor-readable storage medium) to perform the steps to implement the present invention.

In FIG. 3, when the algorithm to identify all cards in a reader's field is started (block 80), both isCardFound (a true or false indicator of whether a card was found in the last iteration of the algorithm; when invoked, this value should be true) and isCollisionFound (a true or false indicator of whether a collision was found in the last iteration of the algorithm; when invoked, this value should be true) are set to "false" (block 82). In the first iteration of the algorithm (block 84), the value of "n," which determines the number of Anticollision timeslots "N," where N=$2^n$, is initially set to 0x00 (block 88). A WUPB command, a polling request that moves cards in the Halted state to the Anticollision state and requests all cards in the Anticollision state to respond, is sent (block 90). The WUPB command also informs the cards in the reader's field of the value of "n," which informs the cards of the number of available timeslots (a number ranging from 0 to $2^n-1$). When the WUPB command is sent, the value of N is assigned to the cards in the field, which each choose a random number from 1 to N as the card's timeslot assignment. The value of N and the timeslot assignment changes each time a WUPB or REQB command is sent. The initial value of the timeslot ("slot") is also set (here the initial value is set to 0x00, though this value may change in other embodiment) (block 92).

If the algorithm is not in its first iteration (block 84) (discussed below in greater detail), an REQB command, a polling command which requests all cards in the Anticollision state to respond, is sent (block 86). As noted above, the value of n and N changes each time a REQB command is sent and the number of Anticollision timeslots N is calculated based on the current value of n and the initial value of the timeslot ("slot") is set as described above (block 92). (In this embodiment, 0<n≦4, so the maximum value of N is 16. Different ranges and starting values of n may be used in other embodiments:)

If the value of the slot is less than the number of slots (block 94), and the algorithm is on its first pass since the WUPB or REQB command was issued (in other words, in this embodiment, slot=0x00) (block 96), and a valid response is received (block 100), isCardFound is set to true (block 102) and the response is saved (block 104). If the algorithm is not on its first pass since the WUPB or REQB command was issued (block 96), a MARKER command, a polling command which sends out a request for cards which have a timeslot assignment which corresponds to the current timeslot to respond (block 98). If a valid response is received (block 100), iscardfound is set to true (block 102) and the response is saved (block 104).

Once the response is saved (block 104), the responding card is then moved to Active or Halted status (block 106). In FIG. 4, the process of moving a card to Active or Halted status begins with a determination of whether a card identification number ("CID"), which is assigned to each card in the Active state, is available or whether the number of card identification numbers has been exceeded (block 58). (The initial value of CID is set to "1" in this embodiment, though a different value may be used in other embodiments. The maximum number of available CIDs is also specified at the start of the algorithm. In this embodiment, the number of available CIDs is 14; this number may change in other embodiments.) If a CID is still available (block 58), the card is placed in the Active state (by sending an ATRRIB command) (block 60), and the number of used CIDs is incremented (block 62). If there are no more available CIDs (block 58), the card is moved to the Halted state (by a HLTB command) (block 64). Referring again to FIG. 3, once the card has been moved to Active or Halted status (block 106), the number of the Anticollision timeslots is incremented (block 108), and the next timeslot is polled as described above in blocks 94 et seq.

If no clear response is detected by the card reader (block 100), a determination of whether the lack of response is due to a collision is made (block 110). If there was a collision (block 110), and no collision has been detected previously in this iteration of the algorithm (in other words, isCollisionFound is not set to "true") (block 112), isCollisionFound is set to "true" (block 114). If n is less than 4 (block 116), n is incremented (block 118), and the slot is incremented (block 108), and the next timeslot is polled as described above in blocks 94 et seq.

If a collision has been detected previously in this iteration of the algorithm (block 112), the slot is incremented (block 108), and the next timeslot is polled as described above in blocks 94 et seq.

If n is greater than 4 (block 116), the slot is incremented (block 108), and the next timeslot is polled as described above in blocks 94 et seq.

Where there was no collision (block 110), the slot is incremented (block 108), and the next timeslot is polled as described above in blocks 94 et seq.

If slot is not less than $2^n$ (block 94), and either isCardFound and isCollisionFound are "true," (block 120), indicating that a card or collision was detected, the variables tracking this information (i.e., isCardFound and isCollisionFound) are set to "false" (block 82), and another iteration of the algorithm is run as described above and below in blocks 84 et seq.

If slot is not less than $2^n$ (block 94), and neither isCardFound and isCollisionFound are "true," (block 120), the list of discovered cards is returned (block 122) and the algorithm is ended (block 124). The algorithm completes where no cards or collisions were seen after inspecting every slot using WUPB, REQB, and MARKER commands.

A pseudo-code implementation of one embodiment of the algorithm is listed below. The following are the function declarations with inputs and outputs explained for the five main anticollision commands:

(byte[ ], int) sendReqbCmd(byte n, byte afi);
(byte[ ], int) sendWupbCmd(byte n, byte afi);
(byte[ ], int) sendSlotMarkerCmd(byte slot);
(byte[ ], int) sendAttribCmd(byte[ ] pupi, byte cid);
(byte[ ], int) sendHltbCmd(byte[ ] pupi)

The above-listed commands have the following inputs and outputs.

Input:

byte n—n specifies the value of "N," the number of anti-collision slots $N=2^n$ and $0<n\leq 4$ byte afi—afi specifies the Application Family Identifier for targeting a subset of the PICCs byte slot—slot specifies the value of "S," the current timeslot $S$=slot+1 and $1\leq$slot$\leq$N−1 byte [ ] pupi—pupi is a four-byte array which contains the Pseudo-Unique PICC Identifier ("PUPI"). The PUPI can be located within the ATQB response received after a REQB, WUPB, or MARKER command byte cid—cid is an assignment of a CID for addressing a specific card during Active state commands CID=cid, $1\leq$cid$\leq$14

Output:

byte [ ] —an array containing any response from the PICC
int—an integer which can have the following values
>0—the length of the data array returned from the PICC
ERR_NO_RESPONSE—Error No Response from the PICC
ERR_Collision—Error Collision between PICCs The card-finding algorithm calls itself recursively. The following is an explanation of the algorithm's interface:
(rf1443card [ ], int listRfCards(
    byte wupbStatus=WUPB_FIRST_ITER,
    byte stateChangeStatus=MAKE_CARDS_ACTIVE,
    byte afi=0×00,
    byte n=0×00,
    byte cid=0×01
    boolean isCardFound=true
    boolean isCollisionFound=true);

The following are inputs and outputs for the interface.

Inputs:
byte wupbStatus—2 possible values
    WUPB-FIRST_ITER—A WUPB is sent during the first iteration of the algorithm to "wake up" cards initially in the Halted state before a list of cards in the reader's field is compiled.
    WUPB-OFF—REQB commands used for polling when this input is used.
byte stateChangeStatus—2 possible values
    MAKE_CARDS_ACTIVE—Will place the first 14 discovered cards into the Active state, then subsequently-discovered cards are moved to the Halted state but accounted for in the list.
    MAKE-CARDS_HALTED—Moves the discovered cards directly into the Halted State.
byte afi—the AFI used by certain applications to make only a subset of polled cards respond to anticollision commands.
byte n—The initial size of n may be set as 0×00, which means N=1; n may be increased if necessary as the algorithm progresses.
byte cid—This is the next CID available in the Active state. Initially, this value may be set to 0×01.
boolean isCardFound—True or false, was a card found in the last iteration of this algorithm? When invoked, this value should be true.
boolean isCollisionFound—True or false, was a collision found in the last iteration of this algorithm? When invoked, this value should be true.

Outputs:
rf1443card [ ]—an array of ISO 14443 RF Smart Card Objects, all identifying the state they are in, their PUPI values, and CID values (if any).
int—the number of entries in the card array also returned from this method.

The following exemplary version of the algorithm assumes there are no cards or PICCs in the Active state at the time the algorithm is started. This is not difficult to implement because Active state command sets typically contain a Deselect command to move a PICC or card into the Halted state. Since in this embodiment only 14 different CIDs are permitted, executing the Deselect command for every CID can clear the Active state.

```
(rf14443card[ ], int) listRfCards ( byte wupbStatus,
    byte stateChangeStatus, byte afi, byte n, byte cid,
    Boolean isCardFound, Boolean isCollisionFound )
{
    // Number of Cards Found
    int numCards = 0;
    // Stores the Cards discovered this iteration
    rf14443card iterCards [16];
    // Stores all the cards from this and recursive
    // iterations (Size is determined later)
    rf14443card[ ] retRfCards;
    // RF Card Response Variables
    int responseLength;
    byte[ ] response;
    // Number of timeslots available this iteration
    byte numSlots = (0x01 << N); // 2^n
    // Stopping Condition No Card and No Collisions
    // Discovered
    if (isCardFound || isCollisionFound)
    {
        isCardFound = false;
        isCollisionFound = false;
        // For a first iteration send WUPB, otherwise
        // REQB
        if (wupbStatus == WUPB_FIRST_ITER) {
            (response, responseLength) =
                sendWupbCmd(n, afi);
        } else {
            (response, responseLength) =
                sendReqbCmd(n, afi);
        }
        // Loop Through the timeslots
        for (byte slot = 0x00; slot < numSlots; slot++ ) {
            if (slot > 0x00) {
                (response, responseLength) =
                    sendSlotMarkerCmd (slot);
            }
            // Check for an ATQB Response from the
            // REQB/WUPB/Marker
            if (responseLength > 0) {
                isCardFound = true;
                // Get card information from the response
                iterCards [numCards].parseAtqb(response);
                // Attempt to move card to Active State
                if (stateChangeStatus ==
                    MAKE_CARDS_ACTIVE) {
                    (response, responseLength) =
                        sendAttribCmd (
                            iterCards [numCards].getPupi
                                ( ), cid);
                    // Successful Response
                    if (responseLength > 0) {
                        cid++;
                        iterCards
                            (numCards] .set Cid
                                (cid);
                    }
                    // Run out of Card ID Numbers
                    if (cid >= 0x0F) {
                        stateChangeStatus =
                            MAKE_CARDS_HALTED;
```

-continued

```
        }
                // Attempt to move card to
                // Halted State
            } else {
                (response,
                    responseLength) =
                    sendHltbCmd (
                    iterCards
                        [numCards] .get Pup
                        i ( ));
            }
            // Successful Response from ATTRIB or
            // HLTB commands
            if (responseLength > 0) {
                numCards++;
            }
        // Card wasn't detected successfully,
        // check for the first collision since last
        // WUPB/REQB
        } else if (responseLength == ERR_COLLISION &&
                !isCollisionFound) {
            isCollisionFound = true;
            if (n < 4) { // n does not exceed 4
                n++;
            }
        } // end-forloop(slot)
        // Recursive Call
        rf14443card[ ] saved RfCards;
        int numSaved Rf Cards;
        (savedRf Cards, numSavedRfCards) =
            listRfCards(WUPB_OFF, stateChangeStatus, afi,
            n, cid, cardFound, collisionFound);
        // {Insert Code
        // Store all of the cards in both iterCards[ ] and
        // savedRfCards[ ]
        // into an array of length numSavedRfCards +
        // numCards called
        //retRfCards (declared at the beginning of the
        // method)
        // End Insert Code}
        numCards += numSavedRfCards;
    }
    return (retRf Cards, numCards);
}
```

What is claimed is:

1. A method for identifying any RF cards in an RF card reader's field, the method comprising:
 a) sending a command from a group of commands including:
  i) a first polling command requesting a response from any card in the field in an Anticollision state, said first polling command also moving any card in a Halted state to the Anticollision state;
  ii) a second polling command requesting a response from any card in the field in the Anticollision state; and
  iii) a third polling command requesting a response from any card in the field in the Anticollision state which has chosen a particular timeslot in which to respond;
 b) where a clear response from the sent command is received from a responding card:
  i) saving the response;
  ii) moving the responding card to an Active state;
  iii) incrementing a timeslot number and, if the incremented timeslot number exceeds a predetermined maximum number of timeslots, moving to step d), otherwise repeating steps a) and b) until no clear response is received;
 c) where no clear response is received from a responding card, determining whether a collision occurred and, if so, repeating steps a) and b) until no clear response is received, and if no collision occurred, moving to step biii);
 d) returning a value indicating a number of responding cards.

2. The method of claim 1 further comprising indicating a number of available timeslots when sending the first or second polling command.

3. The method of claim 1 further comprising clearing the Active state.

4. The method of claim 1 further comprising moving the responding card to a Halted state when a number of available card identification numbers is exceeded.

5. The method of claim 1 further comprising returning a value indicating the number of responding cards when there are no more cards to be found in the field.

6. The method of claim 1 further comprising returning a value indicating the number of responding cards when the number of CID slots for Active State Cards is filled.

7. The method of claim 1 further comprising specifying a type of card to be targeted.

8. The method of claim 1 wherein the first polling command is the first command to be sent.

9. The method of claim 1 further comprising increasing a number of timeslots.

10. A processor-readable storage medium having processor-readable code embodied on said processor-readable storage medium, said processor-readable code for programming a processor to perform a method for identifying any RF cards in an RF card reader's field, the method comprising:
 a) sending a command from a list including:
  i) a first polling command requesting a response from any card in the field in an Anticollision state, said first polling command also moving any card in a Halted state to the Anticollision state;
  ii) a second polling command requesting a response from any card in the field in the Anticollision state; and
  iii) a third polling command requesting a response from any card in the field in the Anticollision state which has chosen a particular timeslot in which to respond;
 b) where a clear response from the sent command is received from a responding card:
  i) saving the response;
  ii) moving the responding card to an Active state;
  iii) incrementing a timeslot number and, if the incremented timeslot number exceeds a predetermined number of timeslots, moving to step d) otherwise repeating steps a) and b) until no clear response is received;
 c) where no clear response is received from a responding card, determining whether a collision occurred and, if so, repeating steps a) and b) until no clear response is received, and if no collision occurred, moving to step biii);
 d) returning a value indicating a number of responding cards.

11. The processor-readable storage medium of claim 10, the method further comprising indicating a number of available timeslots when sending the first or second polling commands.

12. The processor-readable storage medium of claim 10, the method further comprising clearing the Active state.

13. The processor-readable storage medium of claim 10, the method further comprising moving the responding card to a Halted state when a number of available card identification numbers is exceeded.

14. The processor-readable storage medium of claim 10, the method further comprising returning a value indicating the number of responding cards when there are no more cards to be found in the field.

15. The processor-readable storage medium of claim 10, the method further comprising returning a value indicating the number of responding cards when the number of CID slots for Active State is filled.

16. The processor-readable storage medium of claim 10, the method further comprising specifying a type of card to be targeted.

17. The processor-readable storage medium of claim 10 wherein the first polling command is the first command to be sent.

18. The processor-readable storage medium of claim 10, the method further comprising increasing a number of timeslots.

* * * * *